Dec. 22, 1970          R. C. STOBB                3,549,460
           ULTRASONIC SEALING OF FILM CARTRIDGES
Filed Aug. 9, 1967                       2 Sheets-Sheet 1

INVENTOR.
Rudolph C. Stobb
BY
Edward H. Loveman
ATTORNEY.

Dec. 22, 1970   R. C. STOBB   3,549,460
ULTRASONIC SEALING OF FILM CARTRIDGES
Filed Aug. 9, 1967   2 Sheets-Sheet 2

INVENTOR.
Rudolph C. Stobb
BY
Edward H. Loveman
ATTORNEY.

United States Patent Office 3,549,460
Patented Dec. 22, 1970

3,549,460
ULTRASONIC SEALING OF FILM CARTRIDGES
Rudolph C. Stobb, Endwell, N.Y., assignor to GAF Corporation, New York, N.Y., a corporation of Delaware
Filed Aug. 9, 1967, Ser. No. 659,358
Int. Cl. B32b 31/20; B06b 3/00
U.S. Cl. 156—580          10 Claims

ABSTRACT OF THE DISCLOSURE

The present invention relates to an apparatus for the ultrasonic sealing of film cartridges. The apparatus consists of a stationary ultrasonic sealing member and a rotatable cylindrically-shaped anvil which is adapted to convey continuously moving cartridges into sealing contact with the sealing member. Another aspect of the invention lies in the provision of a pressure bar which extends through the ultrasonic sealing member so as to maintain the sealed cartridge in a compressed condition until the sealing sequence is completed.

---

Figure 1:
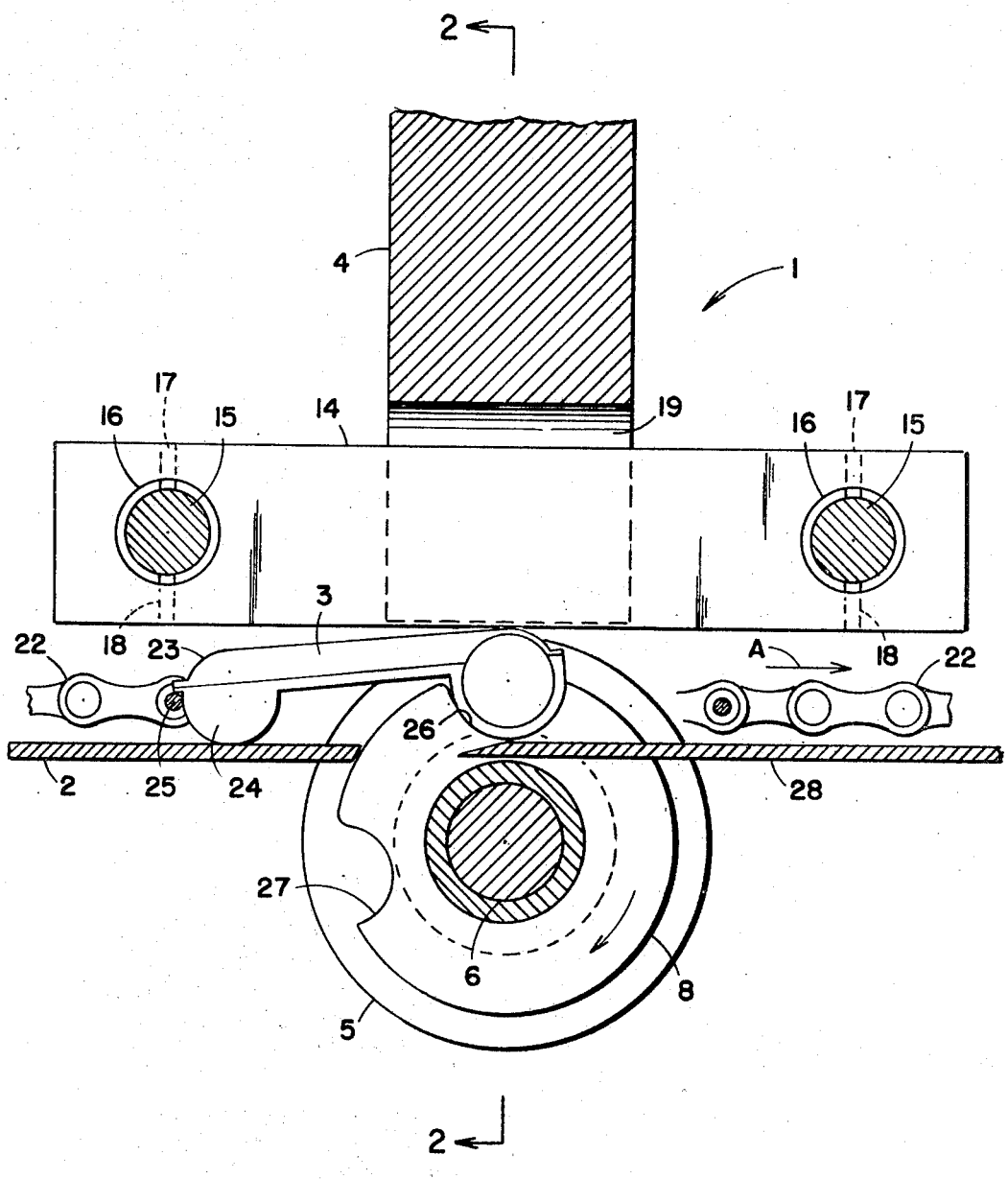

This invention relates to a sealing apparatus and, more particularly, to an improved and novel ultrasonic sealing apparatus for the sealing of plastic film cartridges.

Until quite recently, the joining together and sealing of thermoplastic articles, such as containers, film cartridges, or the like, has been accomplished by assembling the segments to be joined and subjecting these to heat and/or pressure or by applying a solvent to the face to be joined. In effect, this caused the thermoplastic material to soften or fuse and permit the bonded coalescence of the individual container segments or portions. Although the sealing bonds obtained through the application of external heat were satisfactory in various instances, at times the externally applied heat proved itself to be unacceptable. Particularly, in the sealing of film cartridges, the sealing or bonding techniques employing elevated temperatures resulted in undue distortions of the sealed film cartridges, thereby precluding their use in connection with cartridge-loading cameras. A further problem encountered was the deleterious effect of the raised temperatures on the unexposed sensitized photographic material or film within the film cartridges.

In order to obviate the foregoing shortcomings and disadvantages encountered in the sealing or bonding of thermoplastic materials, particularly in connection with the manufacture of film cartridges, it has been proposed that ultrasonic energy be utilized in lieu of externally applied heat. Generally, the apparatus used in the ultrasonic sealing or bonding of thermoplastic materials comprises a generator producing an alternating current in the ultrasonic frequency range; a transducer, which is adapted to convert the high frequency alternating current into a high frequency longitudinal mechanical vibration or compressional wave; an acoustic impedance transformer connected to one end of the transducer which is operative to amplify the magnitude of the vibrations transmitted therethrough; and a tool attached to the output end of the transformer for vibration therewith in the direction of the longitudinal axis of the transformer. In cooperation with the ultrasonic apparatus, a hard surface or anvil is adapted to support the thermoplastic materials to be bonded or sealed, and with the tool acting against the surface of the theromplastic material in a plane perpendicular to that of the support surface or anvil.

During the utilization of the aforedescribed ultrasonic sealing apparatus, the tool is vibrated in directions perpendicular to the plane of the segments of thermoplastic material, i.e., normal to the joining edge between the upper and lower halves of a film cartridge, and in the direction of the longitudinal axis of the transducer and the transformer. The rapid tool vibration results in a repeated compressing of the thermoplastic materials at ultrasonic or extremely high frequencies, thereby generating heat internally within the thermoplastic materials. This results in a fusion or bonding of the joined or superimposed thermoplastic materials in the region of tool vibration without affecting substantial areas of the thermoplastic material in the areas usrrounding or adjacent to the bonded joint. In essence, the superimposed film cartridge halves are positioned on a hard supporting surface or anvil, and are subjected to the action of the ultrasonic vibrating tool over predetermined surface portions thereof in order to form a sealed cartridge. Although the ultrasonic sealing apparatuses have substantially overcome the problem encountered in other prior art heat sealing techniques, film cartridge production rates have not been able to keep up with commercial and technological demands. This is due to the rather slow output speeds of ultrasonic sealing apparatuses where the film cartridges being sealed must remain stationary during the bonding sequence.

The novel and improved ultrasonic sealing apparatus according to the present invention overcomes the foregoing and other disadvantages and limitations encountered in the prior art by providing an ultrasonic sealing apparatus which is adapted to seal film cartridge halves or segments moving at continuous and rapid speeds. To this effect, the ultrasonic sealing apparatus includes a generally stationary, resiliently mounted sealing member or "horn," and a rotatable, cartridge-conveying anvil positioned therebelow. The continuously rotating anvil will, in conjunction with other conveying or pushing devices, move the superimposed film cartridge segments past the ultrasonic sealing member in surface contacting relationship, thereby facilitating the ultrasonic sealing between the cartridge segments at high, continuous rates of cartridge speed.

Accordingly, it is a primary object of the present invention to provide an improved ultrasonic sealing apparatus adapted to join together thermoplastic materials.

Another object of the present invention is to provide an ultrasonic sealing apparatus for the bonding and sealing together of continuously moving film cartridge segments.

A further object of the present invention is to provide an ultrasonic bonding and sealing apparatus including a stationary ultrasonic sealing element, and a rotating anvil adapted to convey continuously moving film cartridge segments past the sealing element in surface contacting relationship.

Figure 2:
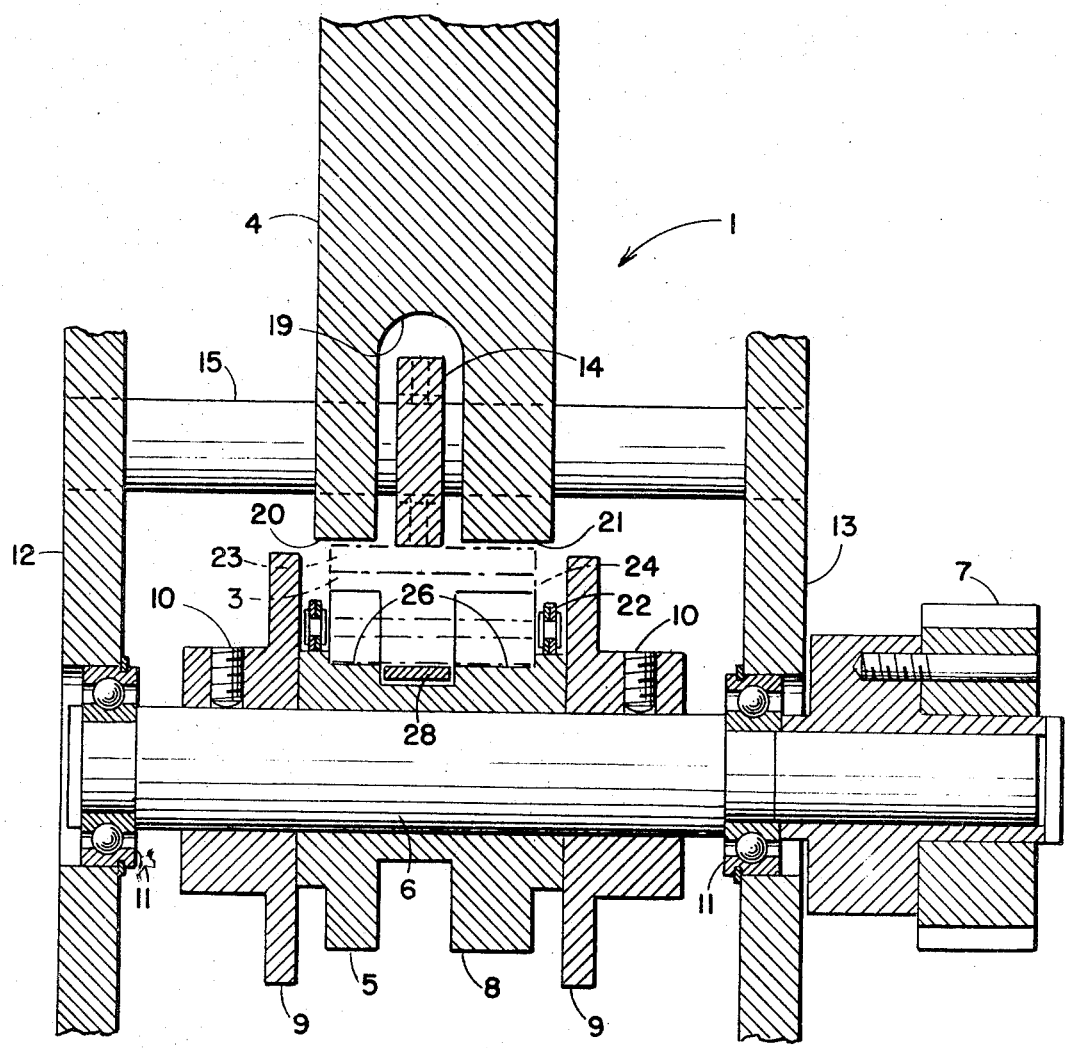

These and other objects and many of the attendant advantages of this invention will be readily appreciated as the same becomes better understood by reference to the following detailed description when considered in connection with the accompanying drawings in which:

FIG. 1 is a sectional elevational view of an ultrasonic sealing apparatus according to the present invention; and FIG. 2 is a sectional view taken along line 2—2 in FIG. 1.

Referring now to the drawings, wherein like reference characters designate like or corresponding parts throughout the several views, FIG. 1 illustrates an ultrasonic sealing apparatus 1. The apparatus 1 includes a substantially flat, horizontal guide support plate 2 along which a plastic film cartridge 3 may be conveyed. Spaced above support plate 2 is a generally upright resiliently mounted ultrasonic sealing member 4. Ultrasonic sealing member 4 is connected to a suitable source of electrical power (not shown). A drum-shaped anvil 5, formed of a hard-surfaced material, is mounted on a shaft 6, and adapted to be rotated by means of a gear 7 fastened to the end of shaft 6. Gear 7 may be driven through any suitable motive power.

Anvil 5 may comprise a central spool portion 8 sandwiched between two flanged discs 9, the latter of which are fastened to shaft 6 by means of setscrews 10. Shaft 6 is rotatably journaled in spaced load bearings 11 which are supported by the side frame members 12 and 13 of the apparatus 1.

An adjustably mounted pressure bar 14 extends above support plate 2 in parallel spaced relationship thereto. Pressure bar 14 is fastened to the frame members 12 and 13 through rods 15 which extend through apertures 16 near each end of the pressure bar 14. The pressure bar 14 may be moved vertically relative to rods 15 by an adjustment of paired opposed set screws 17, 18 extending vertically through the pressure bar in engagement with rods 15. The rods 15 are positioned on both sides of ultrasonic sealing member 4, upstream and downstream of anvil 5, so that pressure bar 14 passes through a slot 19 in ultrasonic sealing member 4. The slot 19, in effect, causes the ultrasonic sealing member 4 to assume a horn-shaped or inverted U configuration, having sealing surfaces 20 and 21 on either side of pressure bar 14.

A continuous conveyor chain 22 may extend on either side of ultrasonic sealing member 4, adapted to be driven in the direction of arrow A. The conveyor chain 22 moves in parallel relationship to the bottom surface of pressure bar 14, in the gap between the latter and support plate 2.

In operation, a film cartridge 3 containing a roll of photographic film which may be a cartridge manufactured by the General Aniline & Film Corporation under the trademark "Anscopak," and which consists of superimposed mating upper portion 23 and lower portion 24, is guided into the gap or space between support plate 2 and pressure bar 14. Conveying or pushing motion may be imparted to the film cartridge 3 by a pusher rod or element 25, extending transversely to the direction of cartridge travel between conveyor chains 22 on either side of the film cartridge. The gap between support plate 2 and pressure bar 14 is somewhat larger than the height of superimposed cartridge portions 23 and 24.

As the leading edge of film cartridge 3 reaches anvil 5, the forward part of the lower cartridge portion 24, which is of an enlarged semicylindrical shape accommodating the spool of film, is engaged by a complementary recess 26 in the central spool portion 8 of anvil 5. Spool portion 8 is of a width generally corresponding to that of or slightly larger than the width of film cartride 3, so that the latter may freely pass between discs 9. Rotation of anvil 5 in the direction of movement of the film cartridge, will cause the latter to have the leading part of the surface of upper portion 23 facing ultrasonic sealing member 4 to contact sealing surfaces 20 and 21. This, in effect, will generate internal heat in the areas of the cartridge contacting surfaces 20 and 21, and cause a bonding or fusing between cartridge portions 23 and 24 in those regions.

As the film cartridge 3 continues its movement, the leading portion is compressed between pressure bar 14 and a parallel spaced support plate 28 so that the seal is maintained until the cartridge has cooled. This will assure that proper bonding has been achieved between cartride portions 23 and 24.

Continued conveyance of cartridge 3, and rotation of anvil 5, will cause the enlarged trailing end of lower portion 24 of the cartridge to be engaged by a second recess 27 in the central spool 8. As the recess 27 is rotated toward the top of the anvil 5, the rear parts of the upper cartridge portion 23 facing ultrasonic sealing member 4 are brought into contact with sealing surfaces 20 and 21. This will assure sealing between the cartridge portions 23 and 24 adjacent to the trailing edge region of the cartridge.

It may be ascertained that the space between pressure bar 14 and support plate 28 is smaller than that between the pressure bar and support plate 2. This gap dimensional difference occurs because upstream of anvil 5, the cartridge may be freely conveyed toward ultrasonic sealing member 4, whereas downstream, after sealing, the cartridge 3 must be subjected to a compressive force to enhance the sealing bond between cartridge portions 23 and 24. Preferably, the gap between pressure bar 14 and support plate 28 is approximately equal to the desired dimensional thickness of the finished sealed cartridge.

Another aspect of the invention lies in that the linear speed or velocity of conveyor chains 22 is synchronized with the rotational velocity of anvil 5, so that continuously smooth conveying motion may be imparted to film cartridge 3 during its travel through the sealing apparatus.

In order to assure adequate sealing contact between the sealing surfaces 20 and 21 of ultrasonic sealing member 4 and the surface of cartridge portion 23, the ultrasonic sealing member 4 may be resiliently mounted so as to exert some degree of pressure on the cartridge passing therebeneath.

From the foregoing, it becomes readily obvious that the novel ultrasonic sealing apparatus according to this invention facilitates the rapid, continuous and efficient sealing of film cartridges and other suitable thermoplastic containers.

It should also be understood that the foregoing relates to only a preferred embodiment of the invention, and that it is intended to cover all changes and modifications of the example of the invention herein chosen for the purposes of the disclosure, which do not constitute departures from the spirit and scope of the invention.

What is claimed is:

1. An apparatus for sealing the mating segments of continuously moving thermoplastic film cartridges, comprising:

a generally stationary ultrasonic sealing member, means for conveying the mated segments of a film cartridge toward said ultrasonic sealing member, and a rotatable anvil, of generally cylindrical configuration and rotatable about a horizontal axis extending transversely to the direction of movement of said cartridge, adaptable to cooperatively engage portions of said cartridge and to conduct the latter into contacting relationship with the surface of said ultrasonic sealing member, so as to seal at least portions of the mating segments of said cartridge.

2. An apparatus as defined in claim 1 wherein at least one segment of said cartridge has an enlarged leading portion and an enlarged trailing portion, the cylindrical surface of said anvil including a first recess for cooperatively engaging the enlarged leading portion of said cartridge and adapted to convey segments of the upper surface of the cartridge into contact with said ultrasonic sealing member, and a second recess for cooperatively engaging the enlarged trailing portion of said cartridge and adapted to convey further segments of the upper surface of the cartridge into contact with said ultrasonic sealing member.

3. An apparatus as defined in claim 2 wherein said rotatable anvil lifts said leading and trailing portions into surface contacting engagement with said ultrasonic sealing member, while concurrently conveying said cartridge in its horizontal direction of movement.

4. An apparatus for sealing the mating segments of continuously moving thermoplastic film cartridges, comprising:

a generally stationary ultrasonic sealing member, means for conveying the mated segments of a film cartridge toward said ultrasonic sealing member, an adjustable pressure bar means, said pressure bar means extending in the direction of movement of said cartridge and adapted to contact the upper surface thereof so as to maintain the mating segments in compressively closed relationship while being conveyed past said ultrasonic sealing member, and a rotatable anvil, of generally cylindrical configuration and rotatable about a horizontal axis extending transversely to the direction of movement of said cartridge, adaptable to cooperatively engage portions of said cartridge and to conduct the latter into contacting relationship with the surface of said ultrasonic sealing member, so as to seal at least portions of the mating segments of said cartridge.

5. An apparatus as defined in claim 4 including guide surface means extending in parallel spaced relationship with said pressure bar means, whereby said sealed cartridge conveyed past said ultrasonic sealing member is compressed between said adjustable pressure bar means and said guide surface means.

6. An apparatus as defined in claim 4 where in said ultrasonic sealing member includes an elongate slot portion extending through its cartridge-engaging surface in the direction of movement of said cartridge, said adjustable pressure bar extending through said slot portion.

7. An apparatus for sealing the mating segments of continuously moving thermoplastic film cartridges, comprising:
a generally stationary ultrasonic sealing member, including means resiliently biasing said ultrasonic sealing member toward the upper segments of said cartridge,
means for conveying the mated segments of a film cartridge toward said ultrasonic sealing member,
and a rotatable anvil, of generally cylindrical configuration and rotatable about a horizontal axis extending transversely to the direction of movement of said cartridge, adaptable to cooperatively engage portions of said cartridge and to conduct the latter into contacting relationship with the surface of said ultrasonic sealing member, so as to seal at least portions of the mating segments of said cartridge.

8. An apparatus for sealing the mating segments of continuously moving thermoplastic film cartridges, comprising:
a generally stationary ultrasonic sealing member,
means for conveying the mated segments of a film cartridge toward said ultrasonic sealing member,
and a rotatable anvil, of generally cylindrical configuration and rotatable about a horizontal axis extending transversely to the direction of movement of said cartridge, adaptable to cooperatively engage portions of said cartridge and to conduct the latter into contacting relationship with the surface of said ultrasonic sealing member, so as to seal at least portions of the mating segments of said cartridge, wherein said cartridge conveying means and said rotatable anvil are driven at synchronous linear velocities so as to convey said cartridge along the surface of said ultrasonic sealing element.

9. An apparatus as defined in claim 8 wherein said cartridge conveying means includes pusher elements adapted to engage the trailing edge portion of said cartridge and impart propulsive forces to the latter.

10. An apparatus as defined in claim 6 wherein said ultrasonic sealing member is of a generally inverted U-shaped configuration, and wherein the extremities of said U-shaped leg portions provide the sealing contact surfaces for said cartridge.

References Cited
UNITED STATES PATENTS

| | | | |
|---|---|---|---|
| 3,224,916 | 12/1965 | Soloff et al. | |
| 3,364,551 | 1/1968 | Nabor et al. | 95—31X |
| 3,364,552 | 1/1968 | Nabor et al. | 95—31X |

BENJAMIN A. BORCHELT, Primary Examiner

J. J. DEVITT, Assistant Examiner

U.S. Cl. X.R.

95—31; 156—73; 264—23

Disclaimer 3,549,460.—*Rudolph C. Stobb*, Endwell, N.Y. ULTRASONIC SEALING OF FILM CARTRIDGES. Patent dated Dec. 22, 1970. Disclaimer filed Sept. 30, 1982, by the assignee, *Eastman Kodak Co.*

Hereby enters this disclaimer to all claims of said patent.

[*Official Gazette April 5, 1983.*]